(12) United States Patent
Kelly

(10) Patent No.: US 9,053,511 B2
(45) Date of Patent: Jun. 9, 2015

(54) SWIPABLE PRODUCT SWATCHING

(71) Applicant: eBay Inc., San Jose, CA (US)

(72) Inventor: Brendan Kelly, Maplewood, NJ (US)

(73) Assignee: eBay Inc., San Jose, CA (US)

( * ) Notice: Subject to any disclaimer, the term of this patent is extended or adjusted under 35 U.S.C. 154(b) by 123 days.

(21) Appl. No.: 13/888,723

(22) Filed: May 7, 2013

(65) Prior Publication Data

US 2014/0337158 A1 Nov. 13, 2014

(51) Int. Cl.
*G06F 3/045* (2006.01)
*G06Q 30/06* (2012.01)
*G06F 3/0484* (2013.01)
*G06F 3/0488* (2013.01)

(52) U.S. Cl.
CPC ........ *G06Q 30/0643* (2013.01); *G06F 3/04847* (2013.01); *G06F 3/0488* (2013.01)

(58) Field of Classification Search
CPC ... G06F 3/017; G06F 3/0354; G06F 3/03547; G06F 3/044; G06F 3/0484; G06F 3/0488; G06F 3/04847; G06Q 30/0601; G06Q 30/0641; G06Q 30/0643
USPC .................. 345/173–179; 178/18.01–18.09, 178/19.01–19.06, 20.01–20.04; 705/26.1–28
See application file for complete search history.

(56) References Cited

U.S. PATENT DOCUMENTS

| 7,877,294 | B2 * | 1/2011 | Inzinna, Jr. .................. 705/26.1 |
| 7,996,278 | B2 * | 8/2011 | Jones et al. .................. 705/26.5 |
| 2004/0078299 | A1 * | 4/2004 | Down-Logan et al. ......... 705/27 |
| 2009/0259567 | A1 * | 10/2009 | Watts .............................. 705/27 |
| 2009/0281925 | A1 * | 11/2009 | Winter et al. ................... 705/27 |

* cited by examiner

*Primary Examiner* — Vijay Shankar
(74) *Attorney, Agent, or Firm* — Schwegman Lundberg & Lundberg, P.A.

(57) ABSTRACT

In an example embodiment, a system for displaying a product in a touch-sensitive display of a hand-held electronic device comprises at least one module, executing on one or more computer processors to present a graphical image representative of the product in the touch-sensitive display, detect a slide-based contact with the touch-sensitive display at or over a first predefined location corresponding to the product image in the display, and display, in response to the detection of the slide-based contact, an array of swatch images associated with variants of the product in the touch-sensitive display.

19 Claims, 8 Drawing Sheets

SWIPABLE PRODUCT SWATCHING

TECHNICAL FIELD

The disclosed embodiments relate generally to user interfaces that employ touch-sensitive displays, and more particularly, to the display of swatches of products on user interfaces on portable electronic devices.

BACKGROUND

Touch screens are now ubiquitous as displays and as user input devices on portable devices, such as mobile telephones and personal digital assistants (PDAs). One problem associated with using touch screens on portable devices is the unintentional activation or deactivation of functions due to unintentional contact with the touch screen and the small size of items appearing in the screen. In web-based applications, swatches for a product, such as different colors of a shirt, for example, have traditionally been represented on web user interfaces with small block images of the color associated with the shirt placed next to a graphical image of the shirt. On the user interfaces of mobile devices there is very little room to show these additional color images, and if viewed in the browser on a mobile device (or tablet), the browser shrinks the screen down, making it difficult to view or click on these images.

SUMMARY

In an example embodiment, the present subject matter provides a system for displaying a product offering in a touch-sensitive display of a hand-held electronic device, the system comprising at least one module, executing on one or more computer processors, to present a graphical image representative of the product in the touch-sensitive display; detect a slide-based contact with the touch-sensitive display at or over a first predefined location corresponding to the product image in the display; and display, in response to the detection of the slide-based contact, an array of swatch images associated with variants of the product in the touch-sensitive display.

In another example embodiment, the present subject matter provides a machine readable medium, including instructions, which when performed by a machine, causes the machine to perform the operations of presenting a graphical image representative of a product in a touch-sensitive display of a hand-held electronic device; detecting a slide-based contact with the touch-sensitive display at or over a first predefined location corresponding to the product image in the display; and displaying, in response to the detection of the slide-based contact, an array of swatch images associated with variants of the product in the touch-sensitive display.

In another example embodiment, the present subject matter provides a portable electronic device comprising a touch-sensitive display; memory; one or more modules including processors operable under instructions stored in the memory to display a product offering in the touch-sensitive display, the instructions including presenting a graphical image representative of the product in the touch-sensitive display; detecting a slide-based contact with the touch-sensitive display at or over a first predefined location corresponding to the product image in the display; and displaying, in response to the detection of the slide-based contact, an array of swatch images associated with variants of the product in the touch-sensitive display.

These and other examples and features of the present subject matter will be set forth in part in the following Detailed Description. This Summary is intended to provide non-limiting examples of the present subject matter. It is not intended to provide an exclusive or exhaustive explanation. The Detailed Description is included to provide further information about the present subject matter.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document. Some embodiments are illustrated by way of example and not limitation in the figures of the accompanying drawings in which.

DEFINITIONS

Figure 1:
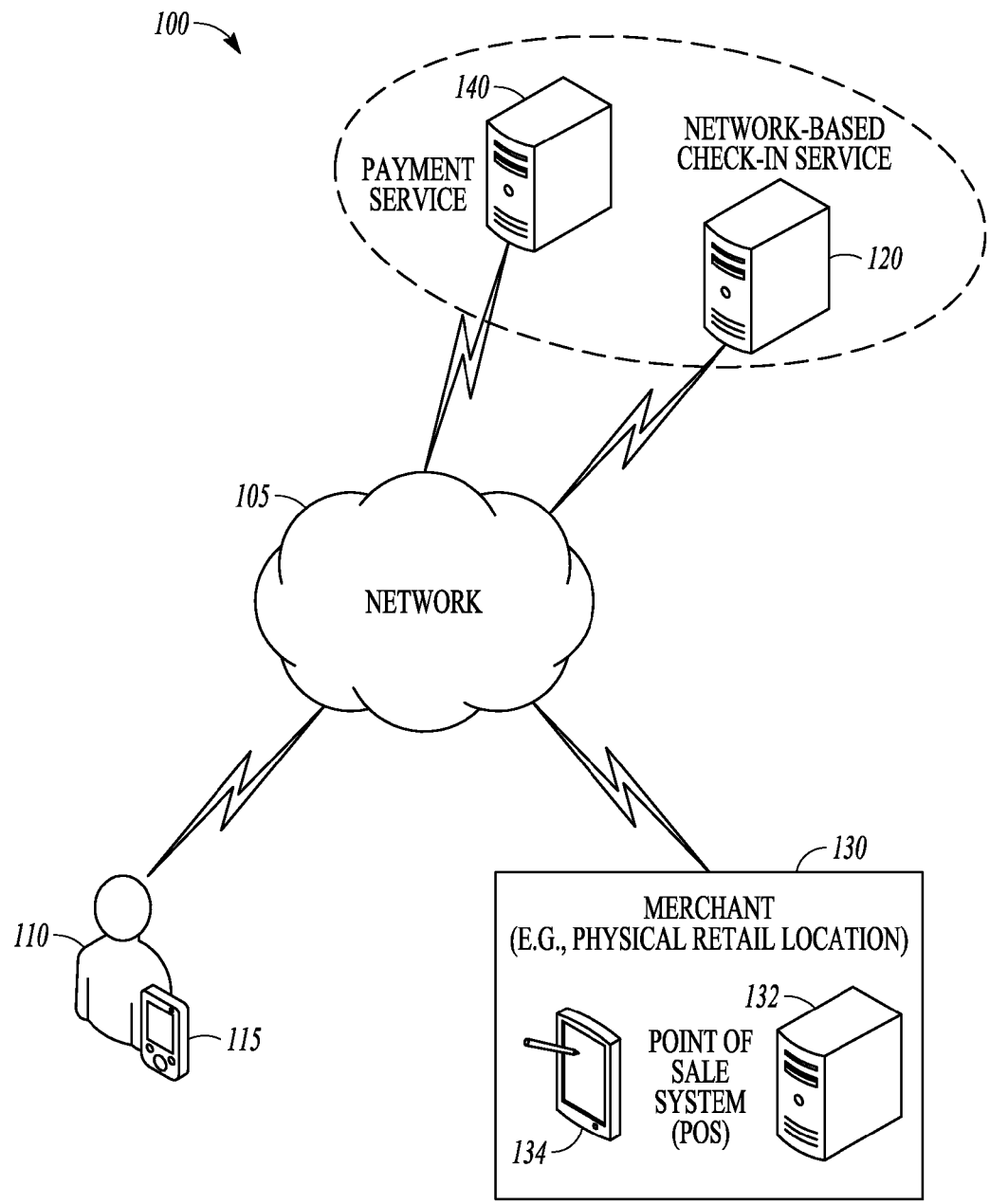
FIG. 1 is a block diagram depicting a system, according to an example embodiment.

Location—For the purposes of this specification and the associated claims, the term "location" is used to refer to a geographic location, such as a longitude/latitude combination or a street address. The term "location" is also used within this specification and claims in reference to a physical location associated with a retail outlet (e.g., store).

Real-time—For the purposes of this specification and the associated claims, the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

Swatch image—an image depicting an aspect relating to a variant of a product. The aspect may include color, texture, material, size, function, purpose, price, configurability, time, and strength of the product variant. Other aspects are possible and will be apparent to a person skilled in the art. A swatch image includes any object that can be displayed to a user, including without limitation text, icons (such as user-interface objects including soft keys), digital images, videos, animations and the like.

Array of swatch images—includes at least one swatch image, in addition to the graphical image of the product.

Product—includes a physical item, or a service. The product may be an item for sale, or part of a product offering, for example. The product may also be a logo, trademark or other device. Other products are possible and will be apparent to a person skilled in the art.

Hand-held electronic device—the terms hand-held, mobile or portable electronic device are used interchangeably in this specification. The term includes smartphones, PDAs, tablets, and so forth.

Graphical image—includes any object that can be displayed to a user, including without limitation text, icons (such as user-interface objects including soft keys), digital images, videos, animations and the like.

Touch-based contact—a contact made by a user on a touch-sensitive screen generally at a single point contact. For example, a user may touch the screen using a finger or other pointing device, such as a tap pen.

Slide-based contact—a contact made by a user on a touch-sensitive screen generally using a swiping action. A user may for example swipe the screen using a finger or other pointing device, such as a tap pen. The swiping action may follow a liner or generally arcuate path over the screen.

DETAILED DESCRIPTION

As mentioned further above, product swatches such as the colors of a shirt have typically been represented on web pages as tiny images of the color displayed below or adjacent the main image of a product. Clicking these images in a web interface typically changes the main image to the swatch color selected. Mobile and tablet devices have a smaller form factor. On a mobile device, these elements are hard to click on or select due to their small size. The swatch images also take up valuable screen space.

The present subject matter uses, in some examples, a "swipe" or "touch-sensitive" interface native to the mobile device to display product swatches on a single product image. In some examples, parallax scrolling (where layers of an image move at different speeds) is employed. For a product image to be displayed or associated with swatches, a user is provided with the ability to view, for example, additional colors of the product simply by "sliding across" the product image. Other swatch images are possible. The additional swatches in some examples appear adjacent the image or, in other examples, may fan out beneath or next to the image like a deck of cards. In some examples, the fanned images "lock" in that position until the user effects a further screen navigation. In some examples, the fanned images retract automatically after a passage of time, or after release of the user's finger from the fanned images on the screen.

Since the user in some examples is simply sliding across a product image to effect a fanning of product swatches, additional touch-screen controls or action elements (such as payment options, "express" or "quick-shop" type implementations) can remain visible and operable. In some examples, the present subject matter allows display of swatches using a slide-based interface rather than a touch-based interface and this can allow slide-based and touch-based controls to be provided simultaneously on a single product image. The provision of such product displays can facilitate the viewing, selection and purchase of products and associated variants online, particularly via mobile devices. The present subject matter can augment the streams of ecommerce accordingly.

Example System

FIG. 1 is a block diagram depicting a system for delivering an ecommerce application of the present subject matter, according to an example embodiment. The system 100 can include a network 105, a user 110, a network-based check-in system 120, a merchant 130, and a network-based payment service 140. In an example, the user 110 can connect to the network-based check-in system 120 via a mobile device 115 (e.g., smart phone, PDA, laptop, or similar mobile electronic device capable of some form of data connectivity). In an example, the merchant 130 can operate computer systems, such as an inventory system 132 or a point of sale (POS) system 134, among others. The network-based check-in system 120 can interact with any of the systems used by merchant 130 for operation of the merchant's retail or service business. In an example, the network-based check-in system 120 can work with both the POS system 134 and inventory system 132 to obtain access to inventory available at individual retail locations run by the merchant 130 and match merchandise on which the merchant 130 wants to offer deals via the network-based check-in system 120. Additionally, the network-based payment service 140 can also interact with the merchant 130 via the POS system 134, enabling the merchant 130 to provide payment services offered by the network-based payment service 140.

Example Operating Environment

Figure 2:
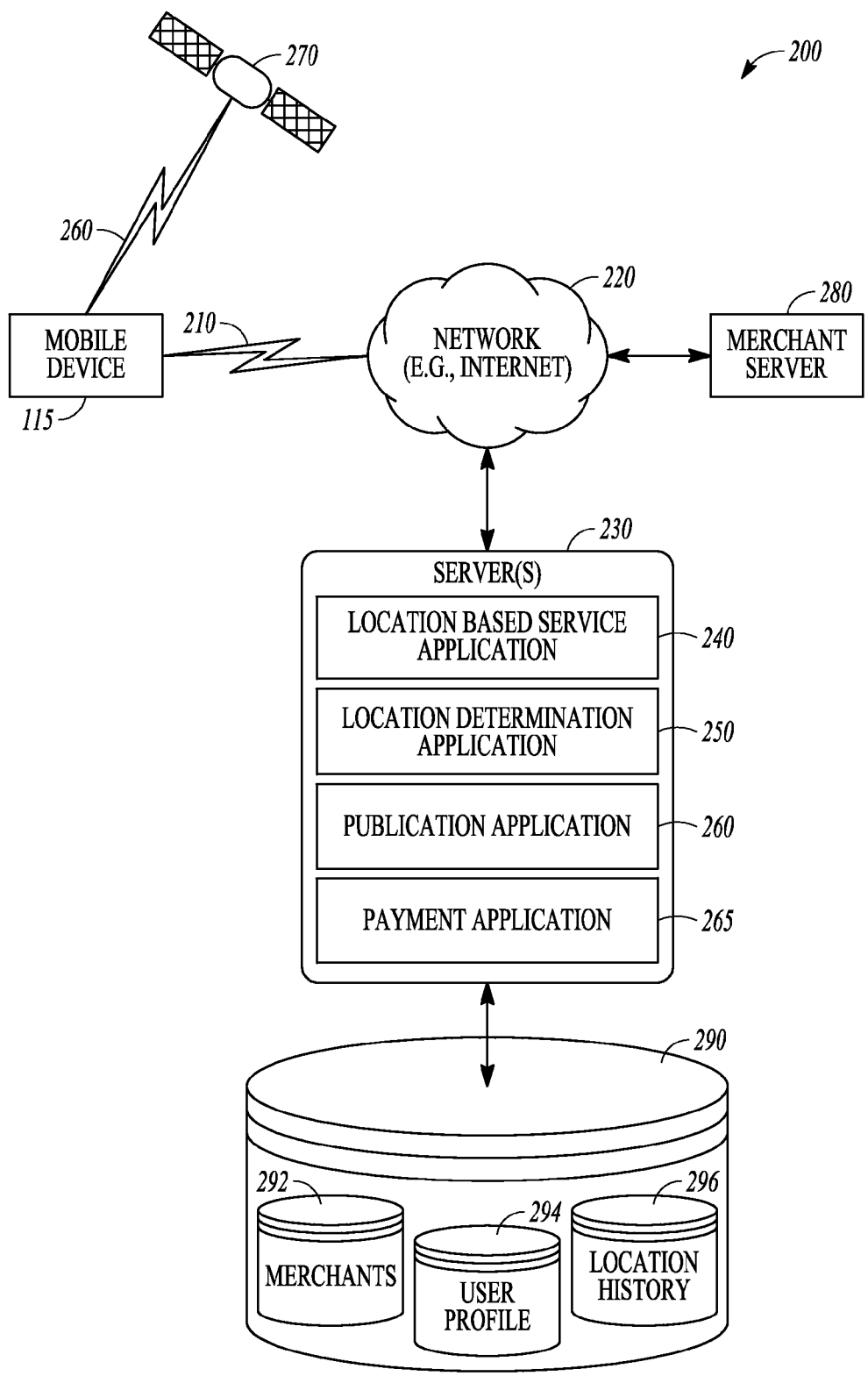
FIG. 2 is a block diagram illustrating an environment for operating a mobile device, according to an example embodiment.

FIG. 2 is a block diagram illustrating an environment for operating a mobile device, according to an example embodiment. The environment 200 is an example environment within which methods of check-in based payment process can occur. The environment 200 can include a mobile device 115, a communication connection 210, a network 220, servers 230, a communication satellite 270, a merchant server 280, and a database 290. The servers 230 can optionally include location-based service application 240, location determination application 250, publication application 260, and payment application 265. The database 290 can optionally include merchant databases 292, user profile database 294, and/or location history database 296. The mobile device 115 represents one example device that can be utilized by a user to receive offers and process payments. The mobile device 115 may be any of a variety of types of devices (for example, a cellular telephone, a personal digital assistant (PDA), a Personal Navigation Device (PND), a handheld computer, a tablet computer, a notebook computer, or other type of movable device). The mobile device 115 may interface via a connection 210 with a communication network 220. Depending on the form of the mobile device 115, any of a variety of types of connections 210 and communication networks 220 may be used.

For example, the connection 210 may be Code Division Multiple Access (CDMA) connection, a Global System for Mobile communications (GSM) connection, or other type of cellular connection. Such connection 210 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 220 may include a cellular network that has a plurality of cell sites of overlapping geographic coverage, interconnected by cellular telephone exchanges. These cellular telephone exchanges may be coupled to a network backbone (for example, the public switched telephone network (PSTN), a packet-switched data network, or other types of networks).

In another example, the connection 210 may be Wireless Fidelity (Wi-Fi, IEEE 802.11x type) connection, a Worldwide Interoperability for Microwave Access (WiMAX) connection, or another type of wireless data connection. In such an embodiment, the communication network 220 may include one or more wireless access points coupled to a local area network (LAN), a wide area network (WAN), the Internet, or other packet-switched data network.

In yet another example, the connection 210 may be a wired connection, for example an Ethernet link, and the communication network may be a LAN, a WAN, the Internet, or other packet-switched data network. Accordingly, a variety of different configurations are expressly contemplated.

A plurality of servers 230 may be coupled via interfaces to the communication network 220, for example, via wired or wireless interfaces. These servers 230 may be configured to provide various types of services to the mobile device 115. For example, one or more servers 230 may execute location based service (LBS) applications 240, which interoperate with software executing on the mobile device 115, to provide LBSs to a user. LBSs can use knowledge of the device's location, and/or the location of other devices, to provide location-specific information, recommendations, notifications, interactive capabilities, and/or other functionality to a user. For example, an LBS application 240 can provide location data to a network-based check-in system 120, which can then be used to assist in generating offers relevant to the user's current location and enable payment via the network-based payment service 140. Knowledge of the device's location, and/or the location of other devices, may be obtained through interoperation of the mobile device 115 with a location determination application 250 executing on one or more of the servers 230. Location information may also be provided by the mobile device 115, without use of a location determination application, such as application 250.

In certain examples, the mobile device 115 may have some limited location determination capabilities that are augmented by the location determination application 250. In some examples, the servers 230 can also include publication application 260 for providing location-aware offers that may be triggered by present or past check-ins with the network-based check-in system 120. In certain examples, location data can be provided to the publication application 260 by the location determination application 250. In some examples, the location data provided by the location determination application 250 can include merchant information (e.g., identification of a retail location). In certain examples, the location determination application 250 can receive signals via the network 220 to further identify a location. For example, a merchant may broadcast a specific IEEE 802.11 service set identifier (SSID) that can be interpreted by the location determination application 250 to identify a particular retail location. In another example, the merchant may broadcast an identification signal via radio-frequency identification (RFID), near-field communication (NFC), or a similar protocol that can be used by the location determination application 250.

Example Mobile Device

Figure 3:
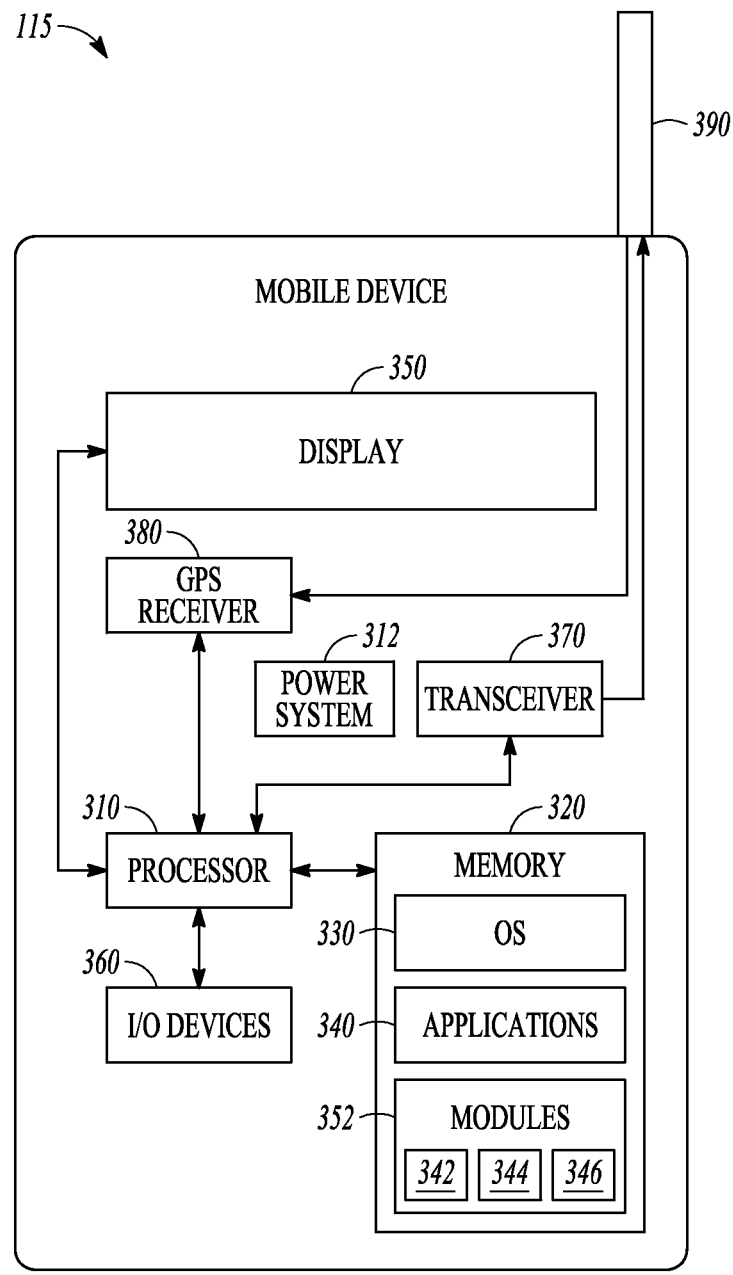
FIG. 3 is a block diagram illustrating a mobile device, according to an example embodiment.

FIG. 3 is a block diagram illustrating a mobile device, according to an example embodiment. The mobile device 115 may include a processor 310. The processor 310 may be any of a variety of different types of commercially available processors suitable for mobile devices (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory, is typically accessible to the processor. The memory 320 may be adapted to store an operating system (OS) 330, as well as application programs (or set of instructions) 340, such as a mobile location enabled application that may provide LBSs to a user. The processor 310 may be coupled, either directly or via appropriate intermediary hardware, to a touch-sensitive display (or touch screen) 350 and to one or more input/output (I/O) devices 360, such as a keypad, a touch panel sensor, a microphone, and the like. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile device 115. In this manner, the connection 210 with the communication network 220 may be established. Further, in some configurations, a GPS receiver 380 may also make use of the antenna 390 to receive GPS signals.

In some embodiments, in addition to the touch screen, the device 115 may include a touchpad (not shown) for activating or deactivating particular functions. In some embodiments, the touchpad is a touch-sensitive area of the device that, unlike the touch-sensitive display 350, does not display visual output. The touchpad may be a touch-sensitive surface that is separate from the touch-sensitive display 350 or an extension of the touch sensitive surface formed by the touch-sensitive display 350.

The mobile device 115 may also include a power system 312 for powering the various components. The power system 312 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the mobile device 115 includes modules 352 such as a communication module (or set of instructions) 342, a contact/motion module (or set of instructions) 344, and a graphics module (or set of instructions) 346.

The communication module 342 facilitates communication with other devices over one or more external ports (not shown) adapted for coupling directly to other devices or indirectly over a network (e.g., the Internet, wireless, LAN, etc.). The contact/motion module 344 detects slide-based or touch-based contact with the touch-sensitive display 350. The contact/motion module 344 includes various software components for performing various operations related to detection of contact with the touch-sensitive display 350, such as determining if contact has occurred, determining if there is movement of the contact and tracking the movement across the display, and determining if the contact has been broken (i.e., if the contact has ceased). Determining movement of the point of contact may include determining speed (magnitude), velocity (magnitude and direction), and/or an acceleration (including magnitude and/or direction) of the point of contact. In some embodiments, the contact/motion module 344 also detects contact on the touchpad.

The graphics module 346 may include various known software components for rendering and displaying graphics on the touch-sensitive display 350. In some embodiments, the graphics module 346 includes an optical intensity module (not shown). The optical intensity module controls the optical intensity of graphical objects, such as user-interface objects, displayed on the touch-sensitive display 350. Controlling the optical intensity may include increasing or decreasing the optical intensity of a graphical object. In some embodiments, the increase or decrease may follow predefined functions.

Example Platform Architecture

Figure 4:
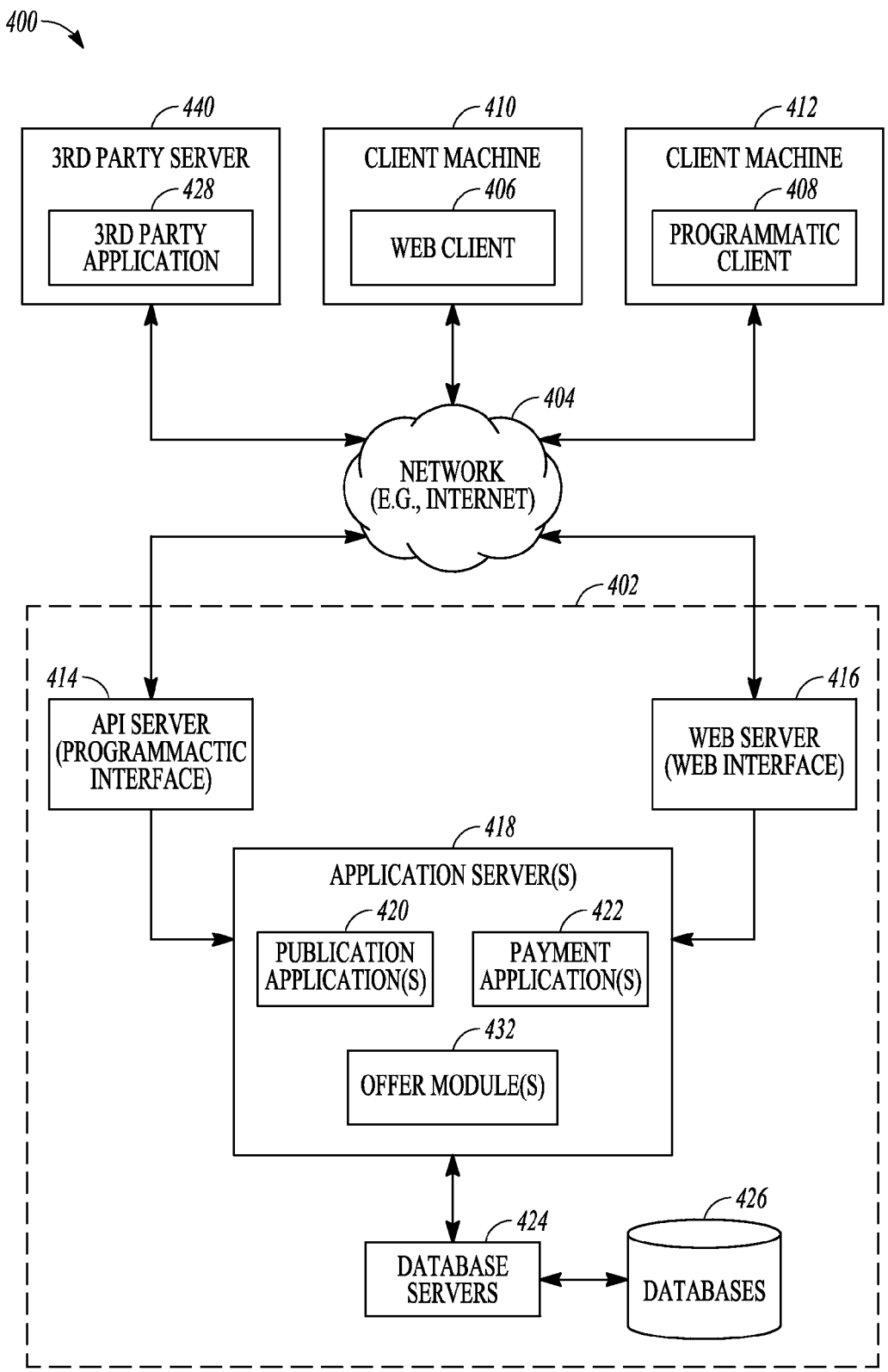
FIG. 4 is a block diagram illustrating a network-based system, according to an example embodiment.

FIG. 4 is a block diagram illustrating a network-based system 400 for delivering hand-held product display functionality in an ecommerce environment, according to an example embodiment. The block diagram depicts a network-based system 400 (in the exemplary form of a client-server system), within which an example embodiment can be deployed is described. A networked system 402, in the example form of a network-based check-in and payment system, provides server-side functionality, via a network 404 (e.g., the Internet or WAN) to one or more client machines 410, 412. FIG. 4 illustrates, for example, a web client 406 (e.g., a browser, such as the Internet Explorer browser developed by Microsoft Corporation of Redmond, Washington State) and a programmatic client 408 (e.g., WHERE™ smartphone application from Where, Inc. of Boston, Mass. or FOURSQUARE™ smartphone application from Foursquare, Inc. of New York, N.Y.) executing on respective client machines 410 and 412. In an example, the client machines 410 and 412 can be in the form of a mobile device, such as mobile device 115.

An Application Programming Interface (API) server 414 and a web server 416 are coupled to, and provide programmatic and web interfaces respectively to, one or more application servers 418. The application servers 418 host one or more publication modules 420 (in certain examples, these can also include commerce modules, advertising modules, and marketplace modules, to name a few), payment modules 422, and location-aware offer modules 432. The application servers 418 are, in turn, shown to be coupled to one or more database servers 424 that facilitate access to one or more databases 426. In some examples, the application server 418 can access the databases 426 directly without the need for a database server 424.

The publication modules 420 may provide a number of publication functions and services to users that access the networked system 402. The payment modules 422 may likewise provide a number of payment services and functions to users. The payment modules 422 may allow users to accumulate value (e.g., in a commercial currency, such as the U.S. dollar, or a proprietary currency, such as "points") in accounts, and then later to redeem the accumulated value for products (e.g., goods or services) that are advertised or made available via the various publication modules 420, within retail locations, or within external online retail venues. The payment modules 422 may also be configured to present or facilitate redemption of offers, generated by the location-aware offer modules 432, to a user during checkout (or prior to checkout, while the user is still actively shopping). The payment modules 422 can also be configured to enable check-in based payment processing. The location-aware offer modules 432 may provide real-time location-aware offers (e.g., coupons or immediate discount deals on targeted products or services) to users of the networked system 402. The location-aware offer modules 432 can be configured to use all of the various communication mechanisms provided by the networked system 402 to present offer options to users. The offer options can be personalized based on current location, time of day, user profile data, past purchase history, or recent physical or online behaviors recorded by the network-based system 400, among other things. While the publication modules 420, payment modules 422, and location-aware offer modules 432 are shown in FIG. 4 to all form part of the networked system 402, it will be appreciated that, in alternative embodiments, the payment modules 422 may form part of a payment service that is separate and distinct from the networked system 402, such as the network-based payment service 140. Additionally, in some examples, the location-aware offer modules 432 may be part of the payment service or may form an offer generation service separate and distinct from the networked system 402. In some examples, the application servers 418 may host other modules that interact with the communication module 342, the contact/motion module 344, and the graphics module 346 in the mobile device 115. In certain examples, the network-based check-in system 120 can include some or all of the application severs 418.

Further, while the system 400 shown in FIG. 4 employs a client-server architecture, the embodiments of the present invention are of course not limited to such an architecture, and could equally well find application in a distributed, or peer-to-peer, architecture system, for example. The various publication modules 420, payment modules 422, and location-aware offer modules 432 could also be implemented as standalone systems or software programs, which do not necessarily have networking capabilities.

The web client 406 accesses the various publication modules 420, payment modules 422, and location-aware offer modules 432 via the web interface supported by the web server 416. Similarly, the programmatic client 408 accesses the various services and functions provided by the publication modules 420, payment modules 422, and location-aware offer modules 432 via the programmatic interface provided by the API server 414. The programmatic client 408 may, for example, be a smartphone application (e.g., the PAYPAL™ payment application developed by eBay, Inc., of San Jose, Calif.) to enable users to make various of payments directly from their smartphones.

FIG. 4 also illustrates a third party application 428, executing on a third party server machine 440, as having programmatic access to the networked system 402 via the programmatic interface provided by the API server 414. For example, the third party application 428 may, utilizing information retrieved from the networked system 402, support one or more features or functions on a website hosted by the third party. The third party website may, for example, provide one or more promotional, marketplace or payment functions that are supported by the relevant applications of the networked system 402. Additionally, the third party website may provide merchants with access to the location-aware offer modules 432 for configuration purposes. In certain examples, merchants can use programmatic interfaces provided by the API server 414 to develop and implement rules-based pricing schemes that can be implemented via the publication modules 420, payment modules 422, and location-aware offer modules 432.

Example Methods

The modules 342, 344, 346, 420, 422, 432 or other modules and system components described above may in some examples be used or configured partially or entirely (either singly or in combination) to perform one or more of the methods described herein, or as set forth below in the following method steps.

Figure 5:
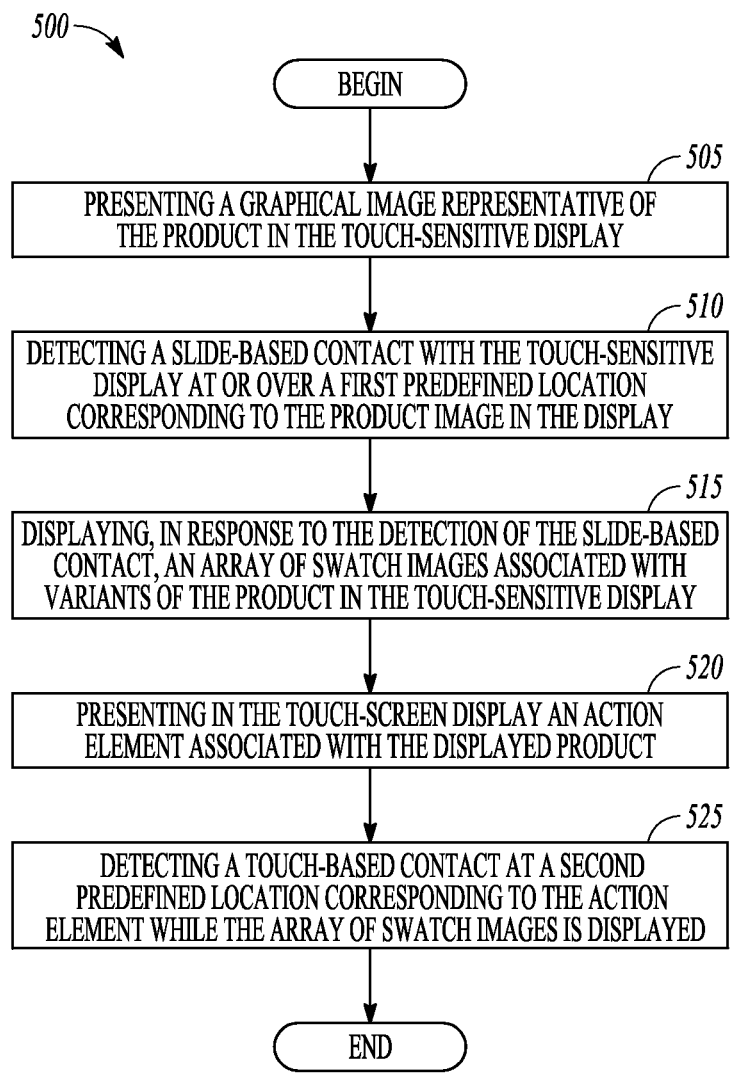
FIG. 5 is a flowchart illustrating a method displaying a product in a touch-sensitive display of a hand-held electronic device, according to an example embodiment.

Some embodiments of the present inventive subject matter include methods of finding web hits for patents. One such embodiment is illustrated in FIG. 5. In this example embodiment, a method 500 of displaying a product in a touch-sensitive display of a hand-held electronic device comprises: at operation 505, presenting a graphical image representative of the product in the touch-sensitive display; at operation 510, detecting a slide-based contact with the touch-sensitive display at or over a first predefined location corresponding to the product image in the display; and at operation 515, displaying, in response to the detection of the slide-based contact, an array of swatch images associated with variants of the product in the touch-sensitive display.

In some examples, the array of swatch images is displayed, at least in part, along a path corresponding to a direction of the slide-based contact. In some examples, each of the swatch images conforms substantially in outline to an outline of the graphical image of the product. In some examples, the array of swatch images is displayed in fanned configuration along an arcuate or linear path, with an uppermost image in the swatch array appearing, at least in part, immediately subjacent the graphical image of the product.

In some examples of the method 500, the displayed array of swatch images is locked in appearance until detection of at least a further touch- or slide-based contact with the touch-sensitive display. In some further examples, the method 500 further comprises, at operation 520, presenting in the touchscreen display an action element associated with the displayed product and, at operation 525, detecting a touch-based contact at a second predefined location corresponding to the action element while the array of swatch images is displayed.

Example Displays of Graphical and Swatch Images

Figure 6A:
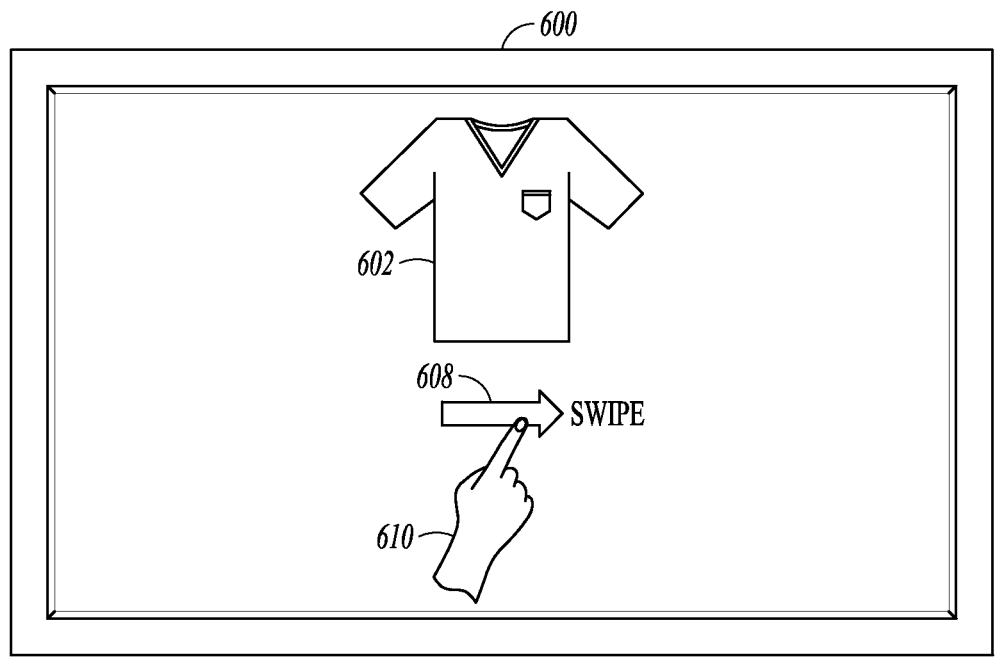
FIGS. 6A-6C show displays of an example graphical product image and swatch images, according to some examples of the present disclosure.
Figure 6B:
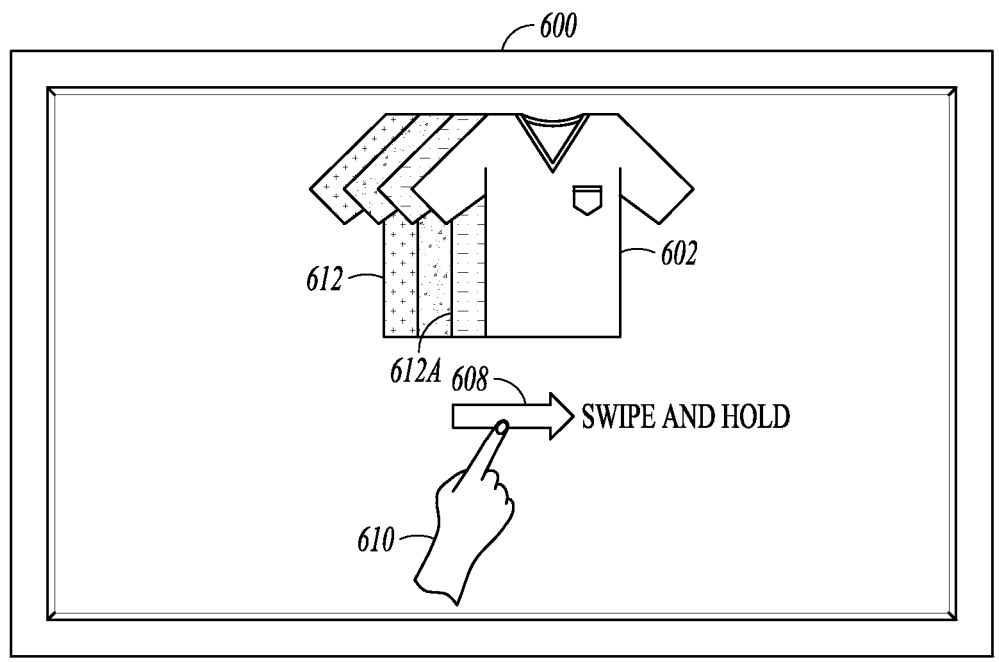
Figure 6C:
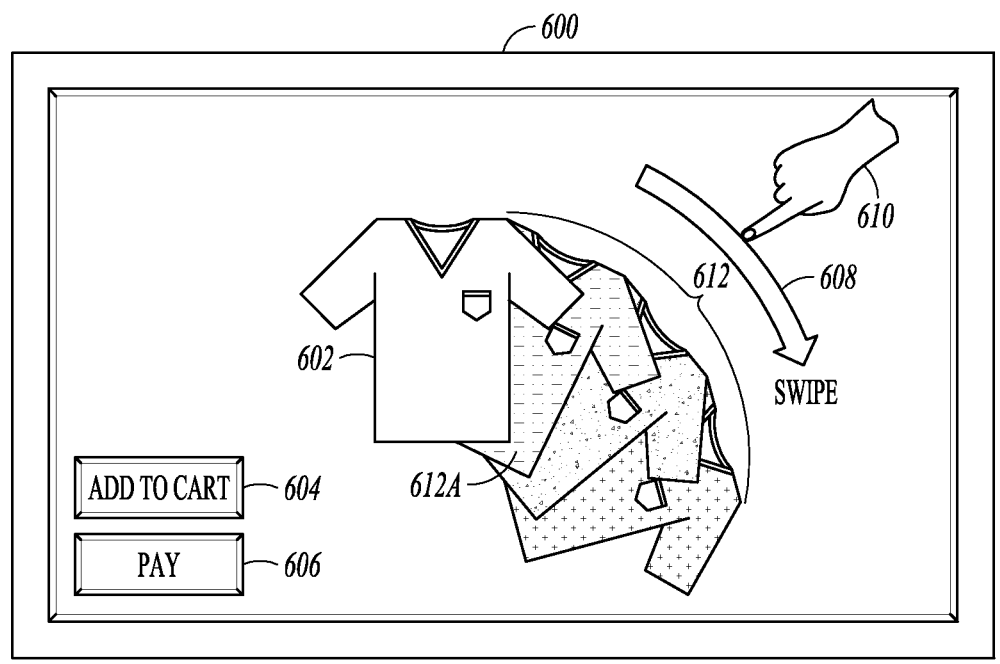

Reference is made to FIGS. 6A-6C of the accompanying drawings. These views generally depict a touch-sensitive display (or touch screen) 600 of a hand-held electronic device. A graphical image 602 of a product is visible in the view. In this example, the product is a shirt offered for sale in an online, ecommerce environment. Other products are possible as set out, for example, in the definition of a graphical image of a product provided further above. The modules 342, 344, 346, 420, 422, 432 or other modules and system components described above may be used or configured partially or entirely (either singly or in combination) to provide the functionality described below.

In FIG. 6A, a user 610 makes a slide-based action 608 to swipe across the graphical image 602 to cause the appearance of an array of swatch images 612 positioned next to the graphical image 602, as shown in FIG. 6B. The swiping action may follow a generally liner path, as shown in FIGS. 6A and 6B, or may follow a generally arcuate path, as shown in FIG. 6C. In some examples, the array of swatch images 612 is displayed, at least in part, along a path corresponding to a direction of the slide-based action 608. A channel or other visual cue may be provided to guide the slide-based action 608 to generate the swatch images 612.

In FIG. 6B, a slide-based action 608 to the right by the user 610 causes the graphical image 602 of the shirt to move to the right in the touch screen 600, while the arrayed display (in this example, displayed in fanned configuration) appears to the left of the graphical image 602. In some examples, when the user 610 releases his/her finger from the touch screen 600, the fanned configuration of swatch images 612 collapses and visually retracts back underneath the overlying graphical image 602 of the product. In other examples, the displayed array of swatch images 612 is locked in appearance until the user 610 makes a further screen navigation or screen contact. In other examples, the fanned swatch images 612 retract automatically after a passage of time.

Each swatch image 612 relates to a different variant of the graphical image 602 of the product. In this example, the swatch images 612 relate to different colors of the shirt available for purchase. Other swatch images are possible, for example, as set out in the definition of a swatch image provided further above. It will be seen that, in these illustrations, each of the swatch images 612 in the array conforms substantially in outline to the outline of the graphical image 602 of the shirt. In some examples, the fanned array of swatch images 612 follows a generally arcuate or linear path with an uppermost image 612A in the swatch array appearing visually, at least in part, immediately subjacent the graphical image 602 of the product.

Since the user 610 in some examples is simply swiping across the graphical image 602 of the product to cause a displayed array of swatch images 612, additional touchscreen controls or action elements can be provided. Example action elements 604 and 606 are visible in FIG. 6C and remain visible and operable even while the slide-based action 608 and display of arrayed swatch images 612 is in effect. Action elements can include payment options (e.g., the PAYPAL™ payment application developed by eBay, Inc., of San Jose, Calif.) to enable users to make various payments directly from their smartphones. Other action elements can include "express" or "quick-shop" type implementation, or add-to-cart options. Other action elements are possible and will be apparent to persons skilled in the art. The action elements 604 and 606 will typically be operated by a user in making a touch-based contact with the touch screen 600. In some examples, slide-based and touch-based controls are possible for the action elements 604 and 606 and can be provided simultaneously on a single product image.

In some examples, the array of swatch images 612 is displayed using a parallax scrolling technique. The parallax scrolling effect is based on a technique that uses multiple background images that move at different, yet synchronized, speeds as the user 610 swipes across the image. The user 610 typically swipes (or scrolls) down or horizontally across the touch-sensitive screen 600. The overall effect gives the viewer a seamless and enhanced browsing experience. The background swatch images translate slower than the graphical image 602 content in the foreground, creating the illusion of 3D depth.

Example Embodiment Statements

To further illustrate the subject matter disclosed herein, a non-limiting list of examples is provided here:
System
A system for displaying a product in a touch-sensitive display of a hand-held electronic device, the system comprising: at least one module, executing on one or more computer processors, to: present a graphical image representative of the product in the touch-sensitive display; detect a slide-based contact with the touch-sensitive display at or over a first predefined location corresponding to the product image in the display; and display, in response to the detection of the slide-based contact, an array of swatch images associated with variants of the product in the touch-sensitive display.

2. The system of statement 1, where the module is further to display the array of swatch images, at least in part, along a path corresponding to a direction of the slide-based contact.

3. The system of statement 1, wherein each of the swatch images conforms substantially in outline to an outline of the graphical image of the product.

4. The system of statement 1, wherein the module is further to display the array of swatch images in fanned configuration along an arcuate or linear path, with an uppermost image in the swatch array appearing, at least in part, immediately subjacent the graphical image of the product.

5. The system of statement 1, wherein the module is further to lock the appearance of the displayed array of swatch images until detection of at least a further touch- or slide-based contact with the touch-sensitive display.

6. The system of statement 1, where the module is further to present in the touch-screen display an action element associated with the product offering and detecting a touch-based contact at a second predefined location corresponding to the action element while the array of swatch images is displayed.

Method

7. A method of displaying a product in a touch-sensitive display of a hand-held electronic device, the method comprising: presenting a graphical image representative of the product in the touch-sensitive display; detecting a slide-based contact with the touch-sensitive display at or over a first predefined location corresponding to the product image in the display; and displaying, in response to the detection of the slide-based contact, an array of swatch images associated with variants of the product in the touch-sensitive display.

8. The method of statement 7, wherein the array of swatch images is displayed, at least in part, along a path corresponding to a direction of the slide-based contact.

9. The method of statement 7, wherein each of the swatch images conforms substantially in outline to an outline of the graphical image of the product.

10. The method of statement 7, wherein the array of swatch images is displayed in fanned configuration along an arcuate or linear path, with an uppermost image in the swatch array appearing, at least in part, immediately subjacent the graphical image of the product.

11. The method of statement 7, wherein the displayed array of swatch images is locked in appearance until detection of at least a further touch- or slide-based contact with the touch-sensitive display.

12. The method of statement 7, further comprising presenting in the touch-screen display an action element associated with the displayed product and detecting a touch-based contact at a second predefined location corresponding to the action element while the array of swatch images is displayed.

Machine-Readable Medium

13. A machine readable medium, including instructions, which when performed by a machine, causes the machine to perform the operations of: presenting a graphical image representative of a product in a touch-sensitive display of a hand-held electronic device; detecting a slide-based contact with the touch-sensitive display at or over a first predefined location corresponding to the product image in the display; and displaying, in response to the detection of the slide-based contact, an array of swatch images associated with variants of the product in the touch-sensitive display.

14. The medium of statement 13, wherein the array of swatch images is displayed, at least in part, along a path corresponding to a direction of the slide-based contact.

15. The medium of statement 13, wherein each of the swatch images conforms substantially in outline to an outline of the graphical image of the product.

16. The medium of statement 13, wherein the array of swatch images is displayed in fanned configuration along an arcuate or linear path, with an uppermost image in the swatch array appearing, at least in part, immediately subjacent the graphical image of the product.

17. The medium of statement 13, wherein the displayed array of swatch images is locked in appearance until detection of at least a further touch- or slide-based contact with the touch-sensitive display.

18. The medium of statement 13, wherein the operations further comprise presenting in the touch-screen display an action element associated with the displayed product and detecting a touch-based contact at a second predefined location corresponding to the action element while the array of swatch images is displayed.

Portable Electronic Device

19. A portable electronic device, comprising: a touch-sensitive display; memory; one or more modules including processors operable under instructions stored in the memory to display a product offering in the touch-sensitive display, the instructions including: presenting a graphical image representative of the product in the touch-sensitive display; detecting a slide-based contact with the touch-sensitive display at or over a first predefined location corresponding to the product image in the display; and displaying, in response to the detection of the slide-based contact, an array of swatch images associated with variants of the product in the touch-sensitive display.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium

Figure 7:
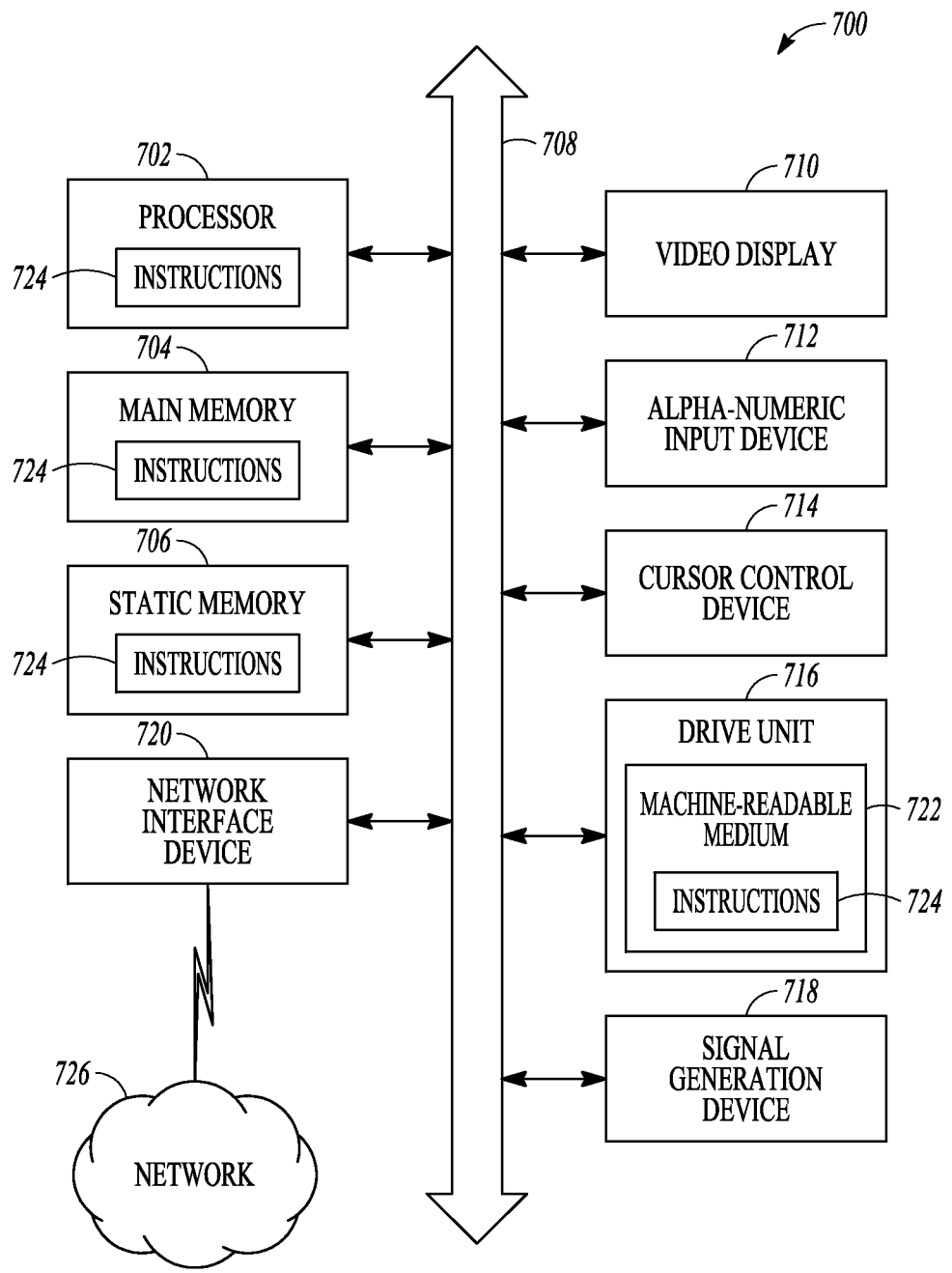
FIG. 7 is a diagrammatic representation of a machine in the example form of a computer system within which a set of instructions for causing the machine to perform any one or more of the methodologies discussed herein may be executed.

FIG. 7 is a block diagram of machine in the example form of a computer system 700 within which instructions 724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of instructions 724 and data structures (e.g., software) embodying or used by any one or more of the methodologies or functions described herein. The instructions 724 may also reside, completely or at least partially, within the main memory 704, static memory 706, and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions for execution by the machine and that cause the machine to perform any one or more of the methodologies of the present inventive subject matter, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although the present inventive subject matter has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A portable electronic device, comprising:
   a touch-sensitive display;
   memory; and
   one or more modules including processors operable under instructions stored in the memory to display a product offering in the touch-sensitive display, the instructions including:
      presenting a graphical image representative of the product in the touch-sensitive display;
      detecting a slide-based contact with the touch-sensitive display at or over a first predefined location corresponding to the graphical image in the display; and
      displaying, in response to the detection of the slide-based contact, an array of swatch images associated with variants of the product in the touch-sensitive display.

2. A system for displaying a product in a touch-se display of a hand-held electronic device, the system comprising:

at least one module, executing on one or more computer processors, to:
- present a graphical image representative of the product in the touch-sensitive display;
- detect a slide-based contact with the touch-sensitive display at or over a first predefined location corresponding to the graphical image in the touch-sensitive display; and
- display, in response to the detection of the slide-based contact, an array of swatch images associated with variants of the product in the touch-sensitive display.

3. The system of claim 1, where the module is further to display the array of swatch images, at least in part, along a path corresponding to a direction of the slide-based contact.

4. The system of claim 1, wherein each of the swatch images conforms substantially in outline to an outline of the graphical image of the product.

5. The system of claim 1, wherein the module is further to display the array of swatch images in fanned configuration along an arcuate or linear path, with an uppermost image in the array appearing, at least in part, immediately subjacent the graphical image of the product.

6. The system of claim 1, wherein the module is further to lock an appearance of the displayed array of swatch images until detection of at least a further touch- or slide-based contact with the touch-sensitive display.

7. The system of claim 1, where the module is further to present in the touch-sensitive display an action element associated with the product offering and detecting a touch-based contact at a second predefined location corresponding to the action element while the array of swatch images is displayed.

8. A method of displaying a product in a touch-sensitive display of a hand-held electronic device, the method comprising:
- presenting a graphical image representative of the product in the touch-sensitive display;
- detecting a slide-based contact with the touch-sensitive display at or over a first predefined location corresponding to the graphical image in the touch-sensitive display; and
- displaying, in response to the detection of the slide-based contact, an array of swatch images associated with variants of the product in the touch-sensitive display.

9. The method of claim 8, wherein the array of swatch images is displayed, at least in part, along a path corresponding to a direction of the slide-based contact.

10. The method of claim 8, wherein each of the swatch images conforms substantially in outline to an outline of the graphical image of the product.

11. The method of claim 8, wherein the array of swatch images is displayed in fanned configuration along an arcuate or linear path, with an uppermost image in the array appearing, at least in part, immediately subjacent the graphical image of the product.

12. The method of claim 8, wherein the displayed array of swatch images is locked in appearance until detection of at least a further touch- or slide-based contact with the touch-sensitive display.

13. The method of claim 8, further comprising presenting in the touch-sensitive display an action element associated with the displayed product and detecting a touch-based contact at a second predefined location corresponding to the action element while the array of swatch images is displayed.

14. A machine readable medium, including instructions, which when performed by a machine, cause the machine to perform the operations of:
- presenting a graphical image representative of a product in a touch-sensitive display of a hand-held electronic device;
- detecting a slide-based contact with the touch-sensitive display at or over a first predefined location corresponding to the graphical image in the touch-sensitive display; and
- displaying, in response to the detection of the slide-based contact, an array of swatch images associated with variants of the product in the touch-sensitive display.

15. The medium of claim 14, wherein the array of swatch images is displayed, at least in part, along a path corresponding to a direction of the slide-based contact.

16. The medium of claim 14, wherein each of the swatch images conforms substantially in outline to an outline of the graphical image of the product.

17. The medium of claim 14, wherein the array of swatch images is displayed in fanned configuration along an arcuate or linear path, with an uppermost image in the array appearing, at least in part, immediately subjacent the graphical image of the product.

18. The medium of claim 14, wherein the displayed array of swatch images is locked in appearance until detection of at least a further touch- or slide-based contact with the touch-sensitive display.

19. The medium of claim 14, wherein the operations further comprise presenting in the touch-sensitive display an action element associated with the displayed product and detecting a touch-based contact at a second predefined location corresponding to the action element while the array of swatch images is displayed.

* * * * *

UNITED STATES PATENT AND TRADEMARK OFFICE
CERTIFICATE OF CORRECTION

PATENT NO. : 9,053,511 B2  
APPLICATION NO. : 13/888723  
DATED : June 9, 2015  
INVENTOR(S) : Brendan Kelly Page 1 of 1

It is certified that error appears in the above-identified patent and that said Letters Patent is hereby corrected as shown below:

Claims

In column 16, line 66, in Claim 2, delete "touch-se" and insert --touch-sensitive--, therefor In column 17, line 12, in Claim 3, delete "1," and insert --2,--, therefor In column 17, line 15, in Claim 4, delete "1," and insert --2,--, therefor In column 17, line 18, in Claim 5, delete "1," and insert --2,--, therefor In column 17, line 23, in Claim 6, delete "1," and insert --2,--, therefor In column 17, line 27, in Claim 7, delete "1," and insert --2,--, therefor Signed and Sealed this  
Twenty-ninth Day of December, 2015

Michelle K. Lee  
*Director of the United States Patent and Trademark Office*